US008451873B2

(12) United States Patent
Zhang

(10) Patent No.: US 8,451,873 B2
(45) Date of Patent: May 28, 2013

(54) METHOD AND APPARATUS FOR RELIABLY LASER MARKING ARTICLES

(75) Inventor: Haibin Zhang, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 130 days.

(21) Appl. No.: 12/871,588

(22) Filed: Aug. 30, 2010

(65) Prior Publication Data

US 2011/0193928 A1 Aug. 11, 2011

Related U.S. Application Data

(63) Continuation-in-part of application No. 12/704,293, filed on Feb. 11, 2010.

(51) Int. Cl.
*H01S 3/10* (2006.01)

(52) U.S. Cl.
USPC ...................... 372/25; 372/1; 372/30; 372/73

(58) Field of Classification Search
USPC ........................................... 372/25, 1, 24, 73
See application file for complete search history.

(56) References Cited

U.S. PATENT DOCUMENTS 4,547,649 A 10/1985 Butt et al.
5,215,864 A * 6/1993 Laakmann .................... 430/293
6,058,739 A 5/2000 Morton et al.
6,590,183 B1 7/2003 Yeo
6,777,098 B2 * 8/2004 Yeo ............................ 428/472.2
7,126,746 B2 * 10/2006 Sun et al. ...................... 359/333
2006/0235564 A1 * 10/2006 Troitski ........................ 700/166
2011/0088924 A1 4/2011 Nashner

FOREIGN PATENT DOCUMENTS

JP 7-204871 A 8/1995

OTHER PUBLICATIONS

Fauchet, P.M.; Gradual surface transitions on semiconductors induced by multiple picosecond laser pulses; Physics Lettters vol. 93A, #3, Jan. 1, 1983; North-Holland; pp. 155-157.
Maja, P. et al.; Dry laser cleaning of anodized aluminum; COLA '99—5th International Conference on Laser Ablation; Jul. 19-23, 1999, Göttingen, Germany; pp. S43-S46.
Ohno, Y.; CIE fundamentals for color measurements; IS&T NIP16 Conference, Oct. 16-20, 2000; Vancouver, CN; pp. 540-545.
Ng, T.W., et al.; Aesthetic laser marking assessment using luminance ratios; Optics and Lasers in Eng. 35; Elvsevier; pp. 177-186.
Wang, J. et al.; Ultrafast dynamics of femtosecond laser-induced periodic surface pattern formation on metals; Appl. Phys. Letters 87; AIP; pp. 251914-1-251914-3.
Vorobyev, A.Y. et al,; Colorizing metals with femtosecond laser pulses; Appl. Phys. Letters 92; AIP; pp. 41914-1-41914-3.
International Search Report and Written Opinion of PCT/US2011/027937, 3 pages.

(Continued)

*Primary Examiner* — Dung Nguyen

(57) ABSTRACT

Disclosed is a method for creating a mark desired properties on an anodized specimen and the mark itself. The method includes providing a laser marking system having a controllable laser pulse parameters, determining the laser pulse parameters associated with the desired properties and directing the laser marking system to mark the article using the selected laser pulse parameters. Laser marks so made have optical density that ranges from transparent to opaque, white color, texture indistinguishable from the surrounding article and durable, substantially intact anodization. The anodization may also be dyed and optionally bleached to create other colors.

19 Claims, 16 Drawing Sheets

OTHER PUBLICATIONS

Fauchet, P.M.; Gradual surface transitions on semiconductors induced by multiple picosecond laser pulses; Physics Lettters vol. 93A, #3, Jan. 1, 1983; North-Holland, Amsterdam, NL; pp. 155-157.
Ng, T.W., et al.; Aesthetic laser marking assessment using luminance ratios; Optics and Lasers in Eng. 35; Elvsevier, Amsterdam, NL; pp. 177-186.
Wang, J. et al.; Ultrafast dynamics of femtosecond laser-induced periodic surface pattern formation on metals; Appl. Phys. Letters 87; AIP; College Park, MD; pp. 251914-1-251914-3.
Vorobyev, A.Y. et al,; Colorizing metals with femtosecond laser pulses; Appl. Phys. Letters 92; AIP; College Park, MD; pp. 41914-1-41914-3.

* cited by examiner

Fluence Thresholds for 532 nm Wavelength

Fluence Thresholds for 1064 nm Wavelength

METHOD AND APPARATUS FOR RELIABLY LASER MARKING ARTICLES

This application is a continuation-in-part of prior application Ser. No. 12/704,293, filed Feb. 11, 2010.

TECHNICAL FIELD

The present invention relates to laser marking of anodized articles. In particular it relates to marking anodized articles in a durable and commercially desirable fashion with a laser processing system. Specifically it relates to characterizing the interaction between ultraviolet, visible and infrared wavelength laser lasers and the anodized articles to reliably and repeatably create durable commercially desirable white marks on anodized articles.

BACKGROUND OF THE INVENTION

Marketed products commonly require some type of marking on the product for commercial, regulatory, cosmetic or functional purposes. Desirable attributes for marking include consistent appearance, durability, and ease of application. Appearance refers to the ability to reliably and repeatably render a mark with a selected shape, color and optical density. Durability is the quality of remaining unchanged in spite of abrasion to the marked surface. Ease of application refers to the cost in materials, time and resources of producing a mark including programmability. Programmability refers to the ability to program the marking device with a new pattern to be marked by changing software as opposed to changing hardware such as screens or masks.

Anodized metal articles, which are lightweight, strong, easily shaped, and have a durable surface finish, have many applications in industrial and commercial goods. Anodization describes any one of a number of electrolytic passivation processes in which a natural oxide layer is increased on metals such as aluminum, titanium, zinc, magnesium, niobium or tantalum in order to increase resistance to corrosion or wear and for cosmetic purposes. These surface layers (also known as "anodic oxide layers") can be colored or dyed virtually any color, making a permanent, colorfast, durable surface on the metal. Many of these metals can be advantageously marked using aspects of the instant invention. In addition, metals such as stainless steel which resist corrosion can be marked in this fashion. Many articles manufactured out of metals such these as are in need of permanent, visible, commercially desirable marking. Anodized aluminum is an exemplary material that has such needs.

Creating color changes on the surface of anodized aluminum articles with laser pulses has been known for several years. An article titled "Dry laser cleaning of anodized aluminum" by P. Maja, M. Autric, P. Delaporte, P. Alloncle, COLA'99—5th International Conference on Laser Ablation, Jul. 19-23, 1999, Göttingen, Germany, published in Appl. Phys. A 69 [Suppl.], S343-S346 (1999), pp S43-S346, describes removing anodization from aluminum surfaces, however, note is taken of color changes which occur at laser energies below that required for removal of anodization from the surface.

One mechanism which has been put forth to explain the change in optical density or color of metallic surfaces is the creation of laser-induced periodic surface structures (LIPSS). The article "Colorizing metals with femtosecond laser pulses" by A. Y. Vorobyev and Chunlei Guo, Applied Physics Letters 92, (041914) 2008, pp 41914-1 to 141914-3 describes various colors which may be created on aluminum or aluminum-like metals using femtosecond laser pulses. This article describes making black or gray marks on metal and creating a gold color on metal. Some other colors are mentioned but no further description is made. LIPSS is the only explanation offered for the creation of marks on metallic surfaces. Further, only laser pulses having temporal pulse widths of 65 femtoseconds are taught or suggested to create these structures. In addition, no mention is made as to whether the aluminum samples are anodized or have had the surface cleaned prior to laser processing. Further the article does not discuss possible damage to the oxide layer.

When discussing laser pulse duration, the method of measuring pulse duration should be defined. Temporal pulse shape can range from simple Gaussian pulses to more complex shapes depending upon the task. Exemplary non-Gaussian laser pulses advantageous for certain types of processing are described in U.S. Pat. No. 7,126,746 GENERATING SETS OF TAILORED LASER PULSES, inventors Sun et al., which patent has been assigned to the assignees of the instant invention and is hereby incorporated by reference. This patent discloses methods and apparatus to create laser pulses with temporal profiles that vary from the typical Gaussian temporal profiles produced by diode pumped solid state (DPSS) lasers. These non-Gaussian pluses are called "tailored" pulses because their temporal profile is altered from the typical Gaussian profile by combining more than one pulse to create a single pulse and/or modulating the pulse electro-optically. This creates a pulse which the pulse energy varies as a function of time, often including one or more power peaks wherein the instantaneous power increases to a value greater than the average power of the pulse for a fraction of the pulse duration. This type of tailored pulse can be effective in processing materials at high rates without causing problems with debris or excessive heating of surrounding material. An issue is that measuring the duration of complex pulses such as these using standard methods typically applied to Gaussian pulses can yield anomalous results. Gaussian pulse durations are typically measured using the full width at half maximum (FWHM) measure of duration. In contrast to this, using the integral square method, as described in U.S. Pat. No. 6,058,739 LONG LIFE FUSED SILICA ULTRAVIOLET OPTICAL ELEMENTS, inventors Morton et al., allows complex pulse temporal shapes to be measured and compared in a more meaningful manner. In this patent, pulse duration is measured using the formula $$t = \frac{\left(\int T(t)dt\right)^2}{\int T^2(t)dt}$$

where T(t) is a function which represents the temporal shape of the laser pulse.

Another problem with reliably and repeatably producing marks with desired color and optical density in anodized aluminum is that the energy required to create very dark marks with readily available nanosecond pulse width solid state lasers is enough to cause damage to the anodization, an undesirable result. "Darkness" or "lightness" or color names are relative terms. A standard method of quantifying color is by reference to the CIE system of colorimetry. This system is described in "CIE Fundamentals for Color Measurements", Ohno, Y., IS&T NIP16 Conf, Vancouver, Conn., Oct. 16-20, 2000, pp 540-545. In this system of measurement, achieving a commercially desirable black mark requires parameters less than or equal to $L^*=40$, $a^*=5$, and $b^*=10$. This results in a neutral colored black mark with no visible grayness or coloration. In U.S. Pat. No. 6,777,098 MARKING OF AN ANODIZED LAYER OF AN ALUMINIUM OBJECT, inventor Keng Kit Yeo describes a method of marking anodized aluminum articles with black marks which occur in a layer between the anodization and the aluminum and therefore are as durable as the anodized surface. The marks described therein are described as being dark grey or black in hue and somewhat less shiny than unmarked portion using nanosecond range infrared laser pulses. In addition, the aluminum is required to be cleaned of all surface particles, for instance particles remaining after polishing, prior to anodization. Making marks according to the methods claimed in this patent are disadvantageous for two reasons: first, creating commercially desirable black marks with nanosecond-range pulses tends to cause destruction of the oxide layer and secondly, cleaning of the aluminum following polishing or other processing adds another step in the process, with associated expense, and possibly disturbs a desired surface finish by further processing.

What is desired but undisclosed by the art is a reliable and repeatable method of making marks on anodized aluminum in either black, white or grey levels in between or in color that does not require an expensive femtosecond laser or disturb the oxide layer in the process or require cleaning following surface preparation. In addition, no information is supplied on how to repeatably create various colors on anodized aluminum surfaces, nor has the effects of bleaching or damage to the anodization layer been thoroughly investigated. What is needed then is a method for reliably and repeatably creating marks having a desired optical density or grayscale and color on anodized aluminum using a lower cost laser, without causing undesired damage to the overlaying oxide or requiring cleaning prior to anodization.

SUMMARY OF THE INVENTION

An aspect of this invention marks anodized aluminum articles with visible white marks of various optical densities. These marks are durable and have commercially desirable appearance. This is achieved by using a laser marking system to create the marks. These marks are created within or underneath the oxide layer and are therefore protected by the oxide. The laser pulses create commercially desirable marks without causing substantial damage to the oxide layer, thereby making the marks durable. Durable, commercially desirable marks are created on anodized aluminum by controlling the laser parameters which create and direct laser pulses. In one aspect of this invention a laser processing system is adapted to produce laser pulses with appropriate parameters in a programmable fashion.

Exemplary laser pulse parameters which may be selected to improve the reliability and repeatability of laser marking anodized aluminum include laser type, wavelength, pulse duration, pulse repletion rate, number of pulses, pulse energy, pulse temporal shape, pulse spatial shape and focal spot size and shape. Additional laser pulse parameters include specifying the location of the focal spot relative to the surface of the article and directing the speed of the relative motion of the laser pulses with respect to the article.

Aspects of this invention create durable, commercially desirable marks by whitening the oxide layer on top of the metallic article with optical densities which range from nearly undetectable with the unaided eye to bright white depending upon the particular laser pulse parameters employed. Other aspects of this invention create durable, commercially desirable marks on anodized aluminum by bleaching or partially bleaching dyed or colored anodization with or without marking the aluminum beneath. Another aspect of this invention creates micro-scale modifications to the anodization layer that scatter light and create marks which vary in appearance from a light "frosted" or diffuse appearance to an opaque, bright, white appearance without total removal of the anodization.

To achieve the foregoing with these and other aspects in accordance with the purposes of the present invention, as embodied and broadly described herein, a method for creating a color and optical density selectable visible mark on an anodized aluminum specimen and apparatus adapted to perform the method is disclosed herein. Aspects of this invention create visible marks with selectable color and optical density on an anodized aluminum article. The method includes providing a laser marking system having a laser, laser optics and a controller operatively connected to said laser to control laser pulse parameters and a controller with stored laser pulse parameters, selecting the stored laser pulse parameters associated with the desired color and optical density, directing the laser marking system to produce laser pulses having laser pulse parameters associated with the desired color and optical density including temporal pulse widths greater than about 1 picosecond and less than about 1000 nanoseconds or continuous wave (CW) to impinge upon said anodized aluminum.

DETAILED DESCRIPTION OF PREFERRED EMBODIMENTS

Figure 1:
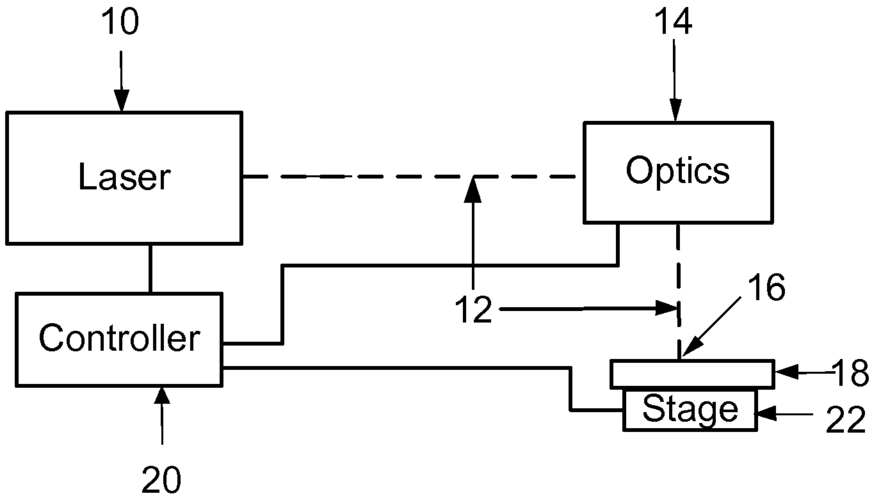
FIG. 1. Laser processing system
FIG. 2. Mark made with prior art nanosecond pulses
FIG. 3. Mark made with picosecond pulses
FIG. 4. Beam waist
FIG. 5. Grayscale marks on anodized aluminum
FIG. 6. Marks on anodized aluminum
FIG. 7. Dyed, visible marked anodized aluminum
FIG. 8. Dyed, IR marked anodized aluminum
FIG. 9. Graph showing visible laser pulse thresholds
FIG. 10. Graph showing IR laser pulse thresholds
FIG. 11. Image data converted to laser parameters
FIGS. 12*a-i*. Color anodization being applied to an aluminum article
FIG. 13. White mark
FIG. 14. Grayscale marks on anodized aluminum

Embodiments of this invention mark anodized aluminum articles with visible marks of various optical densities and colors, durably, selectably, predictably, and repeatably. It is advantageous for these marks to appear on or near the surface of the aluminum or within the anodization and leave the anodization layer substantially intact to protect both the surface and the marks. Marks made in this fashion are referred to as interlayer marks since they are made at or on the surface of the aluminum beneath the oxide layer that forms the anodization, or within the oxide layer itself. Embodiments of this invention leave the surface of the oxide substantially intact following marking in order to protect the marks and provide a surface that is mechanically contiguous between adjacent marked and non-marked regions. The texture of these marks is typically indistinguishable to the human touch from the surrounding, unmarked anodization. Further, these marks should be able to be produced reliably and repeatably, meaning that if a mark with a specific color and optical density is desired, a set of laser parameters is known which will produce the desired result when the anodized aluminum is processed by a laser processing system. It is also contemplated that in some cases white marks created by modifying the anodization layer with laser processing be further processed by addition of fluorescent or phosphorescent dyes to the anodization either before of after laser processing.

An embodiment of the instant invention uses an adapted laser processing system to mark anodized aluminum articles. An exemplary laser processing system which can be adapted to mark anodized aluminum articles is the ESI MM5330 micromachining system, manufactured by Electro Scientific Industries, Inc., Portland, Oreg. 97229. This system is documented in ESI publication "Model 5330 ns Service Guide", ESI P/N 178987a, October 2009, which is included in its entirety by reference. This system is a micromachining system employing a diode-pumped Q-switched solid state laser with an average power of 5.7 W at 30 K Hz pulse repetition rate, second harmonic doubled to 532 nm wavelength. Another exemplary laser processing system which may be adapted to mark anodized aluminum articles is the ESI ML5900 micromachining system, also manufactured by Electro Scientific Industries, Inc., Portland, Oreg. 97229. This system is documented in ESI publication "Model 5900 Service Guide", ESI P/N 178472A, October 2009, which is included in its entirety by reference. This system employs a solid state diode-pumped laser which can be configured to emit wavelengths from about 355 nm (UV) to about 1064 nm (IR) at pulse repetition rates up to 5 MHz. Either system may be adapted by the addition of appropriate laser, laser optics, parts handling equipment and control software to reliably and repeatably produce marks in anodized aluminum surfaces according to the methods disclosed herein.) These modifications permit the laser processing system to direct laser pulses with the appropriate laser parameters to the desired places on an appropriately positioned and held anodized aluminum article at the desired rate and pitch to create the desired mark with desired color and optical density.

FIG. 1 shows a diagram of an ESI MM5330 micromachining system adapted for marking articles according to an embodiment of the instant invention. Adaptations include the laser 10, which, in an embodiment of this invention is a diode pumped Nd:$YVO_4$ solid state laser operating at 1064 nm wavelength, model Rapid manufactured by Lumera Laser GmbH, Kaiserslautern, Germany. This laser is optionally frequency doubled using a solid state harmonic frequency generator to reduce the wavelength to 532 nm or tripled to about 355 nm, thereby creating visible (green) or ultraviolet (UV) laser pulses, respectively. This laser 10 is rated to produce 6 Watts of continuous power and has a maximum pulse repetition rate of 1000 KHz. This laser 10 produces laser pulses 12 with duration of 1 picosecond to 1,000 nanoseconds in cooperation with controller 20. These laser pulses 12 may be Gaussian or specially shaped or tailored by the laser optics 14 to permit desired marking. The laser optics 14, in cooperation with the controller 20, direct laser pulses 12 to form a laser spot 16 on or near article 18. Article 18 is fixtured upon stage 22, which includes motion control elements which, in cooperation with the controller 20 and laser optics 14 provides compound beam positioning capability. Compound beam positioning is the capability to mark shapes on an article 18 while the article 18 is in relative motion to the laser spot 16 by having the controller 20 direct steering elements in the laser optics 14 to compensate for the relative motion induced by motion of the stage 22, the laser spot 16 or both.

The laser pulses 12 are also shaped by the laser optics 14 in cooperation with controller 20, as they are directed to form a laser spot 16 on or near article 18. The laser optics 14 directs the laser pulses' 12 spatial shape, which may be Gaussian or specially shaped. For example, a "top hat" spatial profile may be used which delivers a laser pulse 12 having an even dose of radiation over the entire spot which impinges the article being marked. Specially shaped spatial profiles such as this may be created using diffractive optical elements. Laser pulses 12 also may be shuttered or directed by electro-optical elements, steerable mirror elements or galvanometer elements of the laser optics 14.

The laser spot 16 refers to the focal spot of the laser beam formed by the laser pulses 12. As mentioned above the distribution of laser energy at the laser spot 16 depends upon the laser optics 14. In addition the laser optics 14 control the depth of focus of the laser spot 16, or how quickly the spot goes out of focus as the plane of measurement moves away from the focal plane. By controlling the depth of focus, the controller 20 can direct the laser optics 14 and the stage 22 to position the laser spot 16 either at or near the surface of the article 18 repeatably with high precision. Making marks by positioning the focal spot above or below the surface of the article allows the laser beam to defocus by a specified amount and thereby increase the area illuminated by the laser pulse and decrease the laser fluence at the surface. Since the geometry of the beam waist is known, precisely positioning the focal spot above or below the actual surface of the article will provide additional precision control over the spot size and fluence.

Figure 2:
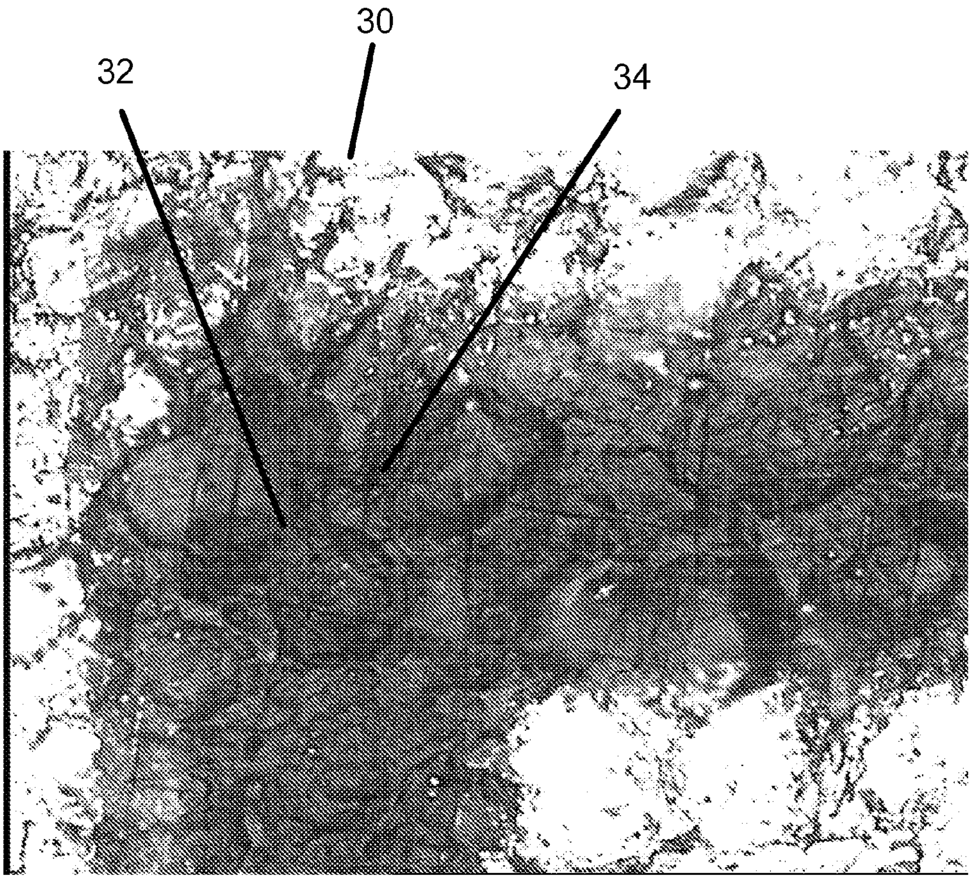
Fig 2 Prior Art
Figure 3:
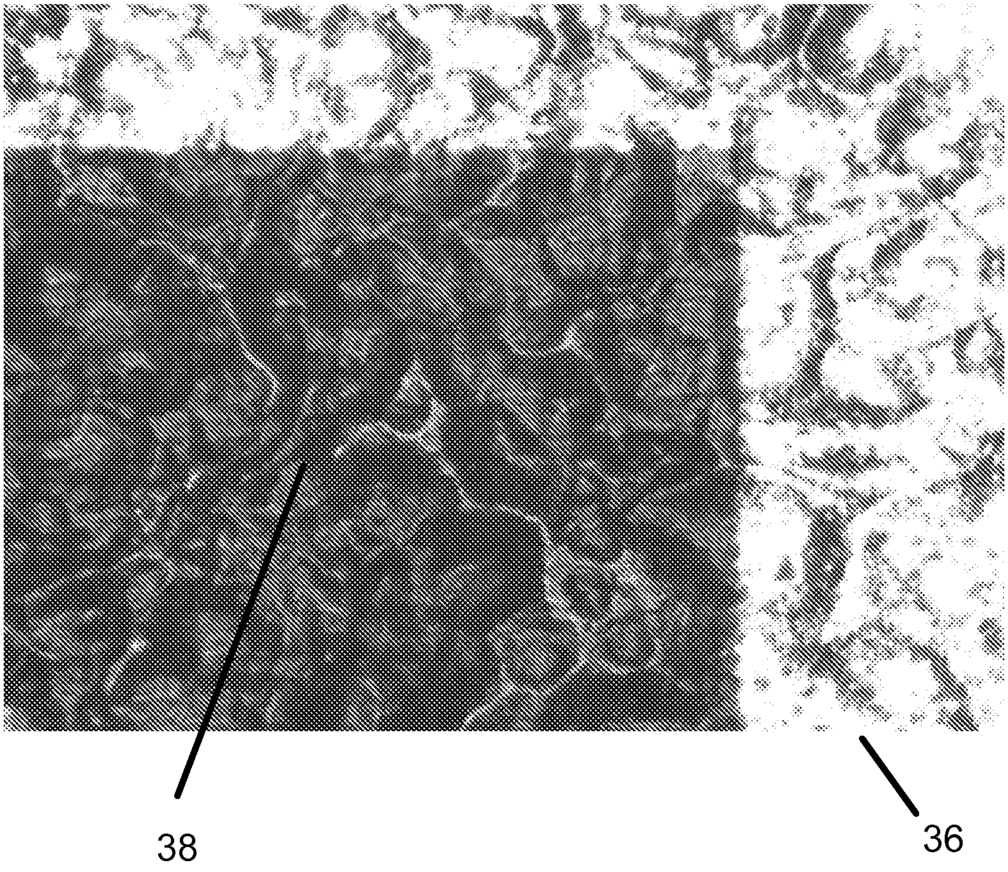

FIG. 2 is a microphotograph showing a mark created on anodized aluminum 30 using prior art laser with >1 nanosecond pulses. The anodization shows clear signs of cracking 32 in the mark area 34, an undesirable result. FIG. 3 shows the same color and optical density mark 38 on the same type of anodized aluminum 36 made with a picosecond laser showing no cracking. Picosecond lasers mark anodized aluminum articles with a commercially desirable black without causing damage to the oxide layer. Commercially acceptable black is defined as a mark having CIE chromaticity of L*=40, a*=5, and b*=10 or less. Another advantage of using picosecond lasers is that they are much less expensive, require much less maintenance, and typically have much longer operating lifetimes than prior art femtosecond lasers. In addition, aspects of the instant invention do not require cleaning of the aluminum surface prior to anodization to create commercially desirable marks.

An embodiment of the instant invention performs marking on anodized aluminum under the anodization. For the interlayer marking to happen without damage to the anodization, the laser fluence, defined by:

$$F=E/s$$

where E is laser pulse energy and s is the laser spot area, must satisfy Fu<F<Fs, where Fu is the laser modification threshold of the substrate, aluminum in this case, and Fs is the damaging threshold for the surface layer, or anodization. Fu and Fs have been obtained by experiments and represents the fluence of the selected laser at which the substrate and surface layer start to get damaged. For 10 ps pulses, our experiments show that Fu for Al is ~0.13 J/cm2 for ps green and ~0.2 J/cm2 for ps IR, and the Fs is ~0.18 J/cm2 for ps green and ~1 J/cm2 for ps IR. Varying the laser fluence between these values creates marks of varying color and optical density. Different pulse durations and laser wavelengths would each have corresponding values of Fu and Fs. The actual thresholds for a given set of laser parameters are determined experimentally.

Figure 4:
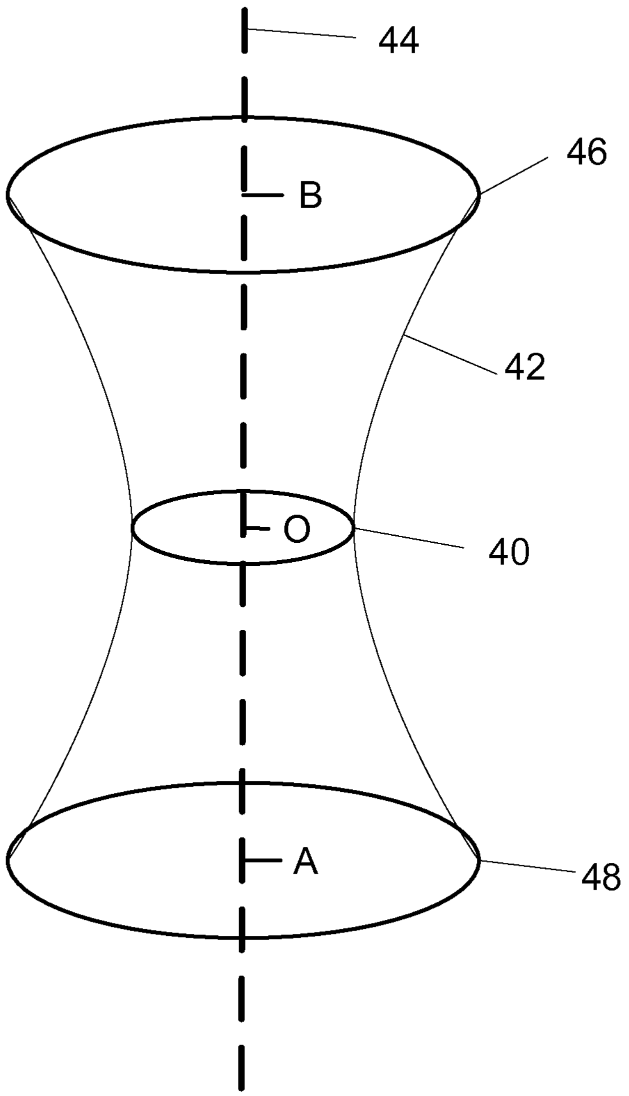

An embodiment of this invention precisely controls the laser fluence at the surface of the aluminum article by adjusting the location of the laser spot from being on the surface of the aluminum article to being located a precise distance above or below the surface of the aluminum. FIG. 4 shows a diagram of a laser pulse focal spot 40 and the beam waist in its vicinity. The beam waist is represented by a surface 42 which is the diameter of the spatial energy distribution of a laser pulse as measured by the FWHM method on the optical axis 44 along which the laser pulses travel. The diameter 48 represents the laser pulse spot size on the surface of the aluminum when the laser processing system focuses the laser pulse at a distance (A-O) above the surface. Diameter 46 represents the laser pulse spot size on the surface of the aluminum when the laser processing system focuses the laser pulses at a distance (O-B) below the surface.

Figure 5:
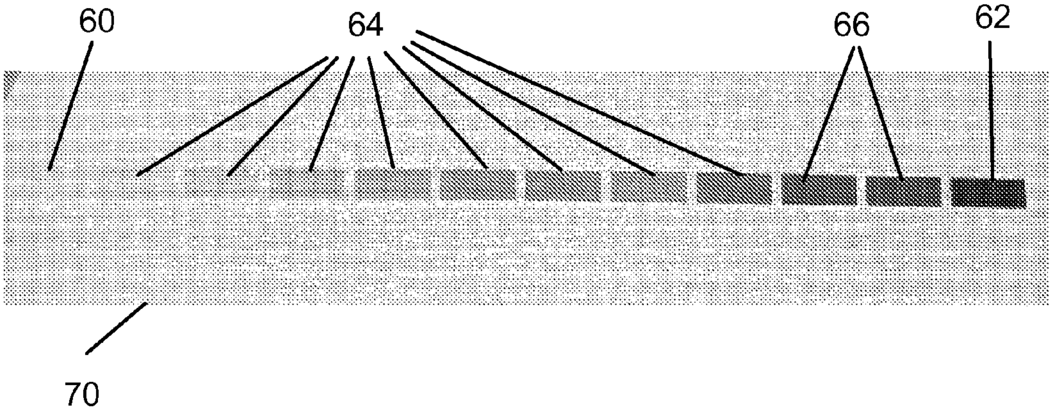
Figure 6:
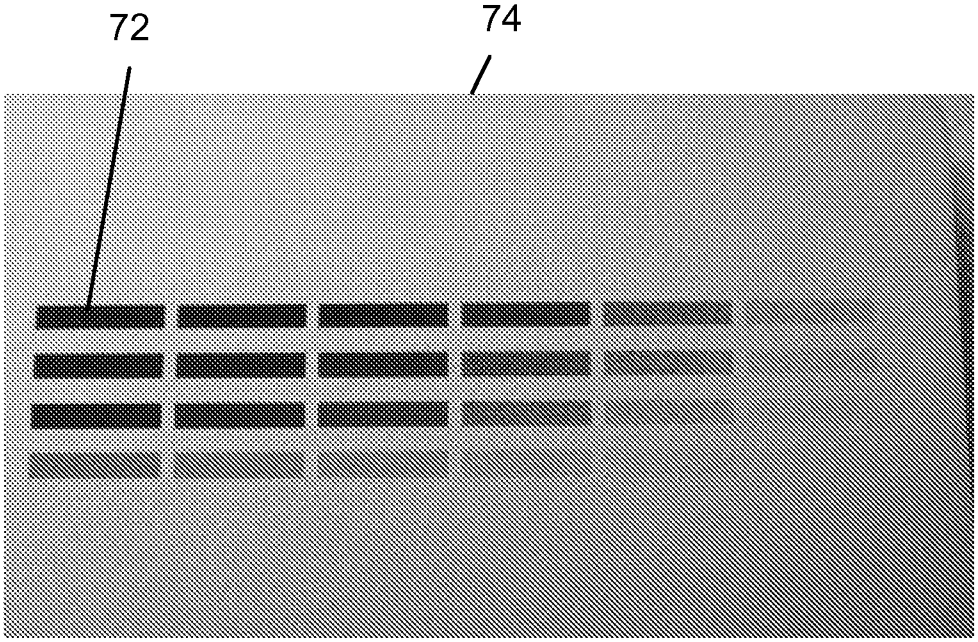

In addition to commercially desirable black, marking articles with grayscale values is also useful. FIGS. 5 and 6 show a series of grayscale marks made on anodized aluminum made by an embodiment of this invention. The optical density of the marks range from nearly indistinguishable from the background to fully black. According to an aspect of the instant invention, each grayscale mark can be identified by a unique triplet of CIE colorimetry values. L*, a* and b*. An aspect of the instant invention associates each desired grayscale value with a set of laser parameters that reliably and repeatably produce the desired grayscale value mark on anodized aluminum upon command. Note also that the marks which may seem indistinguishable to the naked eye can become visible when illuminated with other than broad spectrum visible light, for example ultraviolet light.

FIG. 5 shows black marks 60, 62, 64, and 66 made on anodized aluminum 70 by an embodiment of this invention. These marks 60, 62, 64, and 66 have CIE chromaticities ranging from less than L*=40, a*=5 and b*=10, to totally transparent making them commercial desirable marks. Another feature of these marks is that since they are underneath undamaged anodization, they have uniform appearance over a wide range of viewing angles. Marks made using prior art methods tend to have wide variation in appearance depending upon viewing angle due to damage to the anodization layer. In particular, when marking with prior art nanosecond pulses, applying enough laser pulse energy to the surface to make dark marks causes damage to the anodization which causes the appearance of the marks to change with viewing angle. Marks made by an aspect of the instant invention do not damage anodization regardless of how dark the marks are, nor do they change in appearance with viewing angle. These improved marks were made with the following laser parameters:

TABLE 1

Laser parameters for color and grayscale marking

| | |
|---|---|
| Laser Type | DPSS Nd:YVO4 |
| Wavelength | 532 nm |
| Pulse duration | 10 ps |
| Pulse temporal | Gaussian |
| Laser power | 4 W |
| Rep Rate | 500 KHz |
| Speed | 25 mm/s |
| Pitch | 10 microns |
| Spot size | 10-400 microns |
| Spot shape | Gaussian |
| Focal Height | 0-5 mm with 0.5 mm step |

The marks 60, 62, 64, 66 range in optical density from virtually unnoticeable 60 against the unmarked aluminum to full black 62. Grayscale optical densities 64, 66 between the two extremes are created by moving the focal spot closer to the article, increasing the fluence and thereby creating darker marks. The height of the focal spot above the surface of the aluminum varies from zero, in the case of the darkest optical density mark 62, increasing by 500 micron increments for each mark 64, 66 from right to left in FIG. 5, ending at 5 mm above the surface for the lightest mark 60. Note that marks 64 created with focal spot located 4.5 to 1.5 mm above the surface of the aluminum show tan or golden colors and marks created with focal spot one mm 62 and 66 or less appear gray or black. Maintaining this precise control over the laser focal spot distance from the work surface in addition to maintaining other laser parameters within normal laser processing tolerances permits laser marks with desired color and optical density to be made on anodized aluminum. In addition, the darkest mark exhibits a CIE chromaticity of less than L*=40, a*=5, and b*=10, making it a commercially desirable black mark.

Another aspect of the instant invention determines the relationship between marks with colors other than grayscale and picosecond laser pulse parameters. Colors other than grayscale can be produced on anodized aluminum in two different ways. In the first, a gold tone can be produced in a range of optical densities. This color is produced by changes made at the interface between the aluminum and the oxide coating. Careful choice of laser pulse parameters will produce the desired golden color without damaging the oxide coating. FIG. 5 also shows various shades of gold or tan created by an aspect of the instant invention.

Laser marking of anodized aluminum can also be achieved by an aspect of the instant invention which uses IR wavelength laser pulses to mark the aluminum. This aspect creates marks of varying grayscale densities by varying the laser fluence at the surface of the aluminum in two different manners. As discussed above, grey scale can be achieved by varying the fluence at the surface by positioning the focal spot above or below the surface of the aluminum. The second manner of controlling grey scale is to vary the total dose at the surface of the aluminum by changing the bite sizes or line pitches when marking the desired patterns. Changing bite sizes refers to adjusting the rate at which the laser pulse beam is moved relative to the surface of the aluminum or changing the pulse repetition rate or both, which results in changing the distance between successive laser pulse impact sites on the aluminum. Varying line pitches refers to adjusting the distance between marked lines to achieve various degrees of overlapping. FIG. 6 shows an aluminum article 74 with an array of marks 72. These marks 72 are arranged in an array of six columns and four rows. The six columns represent six Z-heights of the focal spot above the surface of the aluminum ranging from 0 (top row) to 5 mm (bottom row). The four rows represent pitches of 5, 10, 20 and 50 microns reading from left to right. As can be seen from FIG. 6, varying the Z-height of the focal spot and varying the pitch of the laser pulses can predictably produce graylevels of any desired optical density from less than CIE L*=40, a*=5, and b*=10 to nearly transparent, thereby producing commercially desirable marks on anodized aluminum.

TABLE 2

Laser pulse parameters for grayscale IR marking

| | |
|---|---|
| Laser Type | DPSS Nd:YVO4 |
| Wavelength | 1064 nm |
| Pulse duration | 10 ps |
| Pulse temporal | Gaussian |
| Laser power | 2.5 W |
| Rep Rate | 500 KHz |
| Speed | 50 mm/s |
| Pitch | 5, 10, 20, 50 microns |

TABLE 2-continued

| Laser pulse parameters for grayscale IR marking | |
|---|---|
| Spot size | 55-130 microns |
| Spot shape | Gaussian |
| Focal Height | 0-5 mm with 1 mm step |

Figure 7:
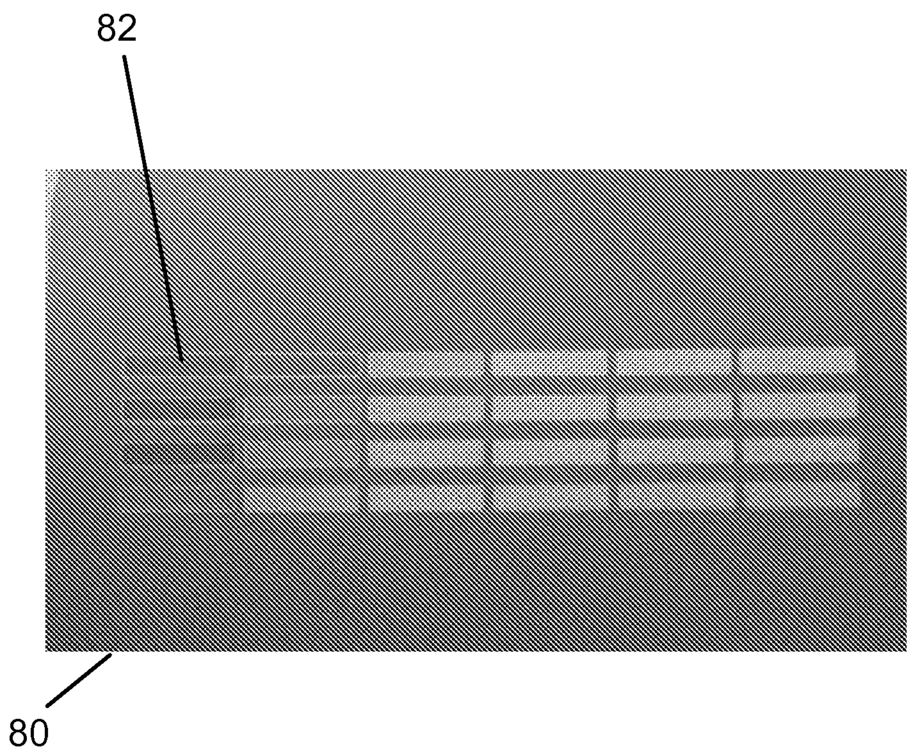
Figure 8:
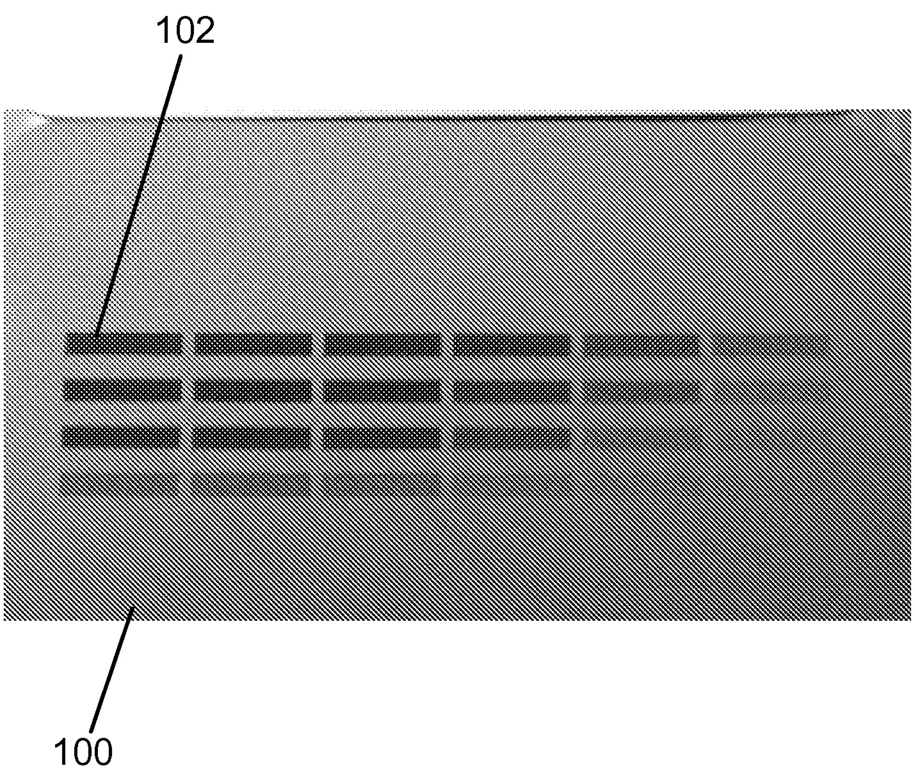

A second type of marking which may be applied to anodized aluminum using picosecond or nanosecond laser pulses is alterations in color contrast caused by bleaching of dyed anodization. In general, anodization is porous, and will readily accept dyes of many types. Referring again to FIG. 3, this microphotograph of anodized aluminum shows the porous nature of surface. Laser pulses used to mark dyed anodized aluminum can, depending upon the wavelength and pulse energy, bleach the dye as it marks the aluminum, making the anodization transparent and thereby reveals the marks on the aluminum underneath. With higher fluence, simultaneous dye bleaching and marking of the aluminum beneath the anodization layer with black, grey scale, or colors presented in previous section is possible. Less energetic pulses can partially bleach the anodization dyes rendering it translucent and thereby partially coloring the underlying aluminum marks. Finally, longer wavelength pulses can mark the aluminum with commercially desirable black or grey scale colors without bleaching the anodization. FIG. 7 shows a dyed anodized aluminum article with marks made with visible (532 nm) laser pulses. Note that the dye in the anodization is bleached in the areas subjected to laser pulses. FIG. 8 shows the same type of dyed anodized aluminum article with marks made with IR (1064 nm) laser pulses. Note that the anodization is not bleached by the IR laser pulses and therefore does not reveal the aluminum color beneath beyond the translucency of the original oxide.

Another aspect of this invention relates to laser marking anodized aluminum with colored anodization using picosecond or nanosecond lasers. Since anodization typically forms a porous surface, dyes can be introduced which alter the appearance of the aluminum. These dyes can either be opaque or translucent, allowing varying amounts of incident light to reach the aluminum and be reflected back through the anodization. FIG. 7 shows an anodized aluminum article 80 with pink dye in the anodization and an array of marks 82 produced according to an aspect of the instant invention. Colors are created by bleaching the dye in the oxide layer as the aluminum underneath showed native (silver) color to a range of laser-marked colors from shades of tan, to gray and finally black. These shades are created by varying the fluence of the laser pulses at the surface of the aluminum. The four rows represent varying the pitch of the laser pulses from 10 to 50 microns and the columns represent varying the focal spot distance from the surface from 0.0 to 5.0 mm. These laser parameters in all cases bleach the dye in the oxide overlaying the aluminum allowing the marks on the aluminum to show through. The laser marks optical density range from transparent to CIE chromaticity less than L*=40, a*=5, b*=10. Laser parameters used to create these marks are given in Table 3.

TABLE 3

| Laser parameters for visible oxide bleaching | |
|---|---|
| Laser Type | DPSS Nd:YOV4 |
| Wavelength | 532 nm |
| Pulse duration | 10 ps |
| Pulse temporal | Gaussian |
| Laser power | 4 W |

TABLE 3-continued

| Laser parameters for visible oxide bleaching | |
|---|---|
| Rep Rate | 500 KHz |
| Speed | 50 mm/s |
| Pitch | 10 microns |
| Spot size | 10-400 microns |
| Spot shape | Gaussian |
| Focal Height | 0-5 mm |

Bleaching of anodization dye is frequency dependent. As shown in FIG. 7, 532 nm laser pulses bleach anodization dye even at the lowest applied fluence. IR laser wavelengths, on the other hand, create marks on dyed anodized aluminum without bleaching the dye for most translucent dye colors. FIG. 8 shows an anodized aluminum article 100 with pink dye with marks 102 made with IR laser pulses. The marks range from translucent to black and were made by altering the laser fluence by both changing the distance from the focal spot to the surface and by changing the pitch. The six columns represent changing the distance between the focal spot of the laser pulses and the surface of the aluminum from 5.5 mm (right) to zero (left). The four rows represent changing the laser pulse pitch from 10 to 50 microns. Laser parameters used to create these marks is shown in Table 4.

TABLE 4

| Laser parameters for IR colored anodization marking | |
|---|---|
| Laser Type | DPSS Nd:YOV4 |
| Wavelength | 1064 nm |
| Pulse duration | 10 ps |
| Pulse temporal | Gaussian |
| Laser power | 4 W |
| Rep Rate | 500 KHz |
| Speed | 50 mm/s |
| Pitch | 10 microns |
| Spot size | 10-400 microns |
| Spot shape | Gaussian |
| Focal Height | 0-5 mm |

Figure 9:
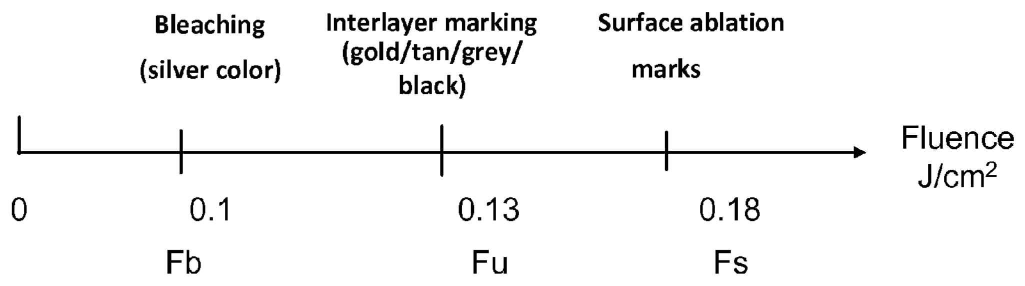
Figure 10:
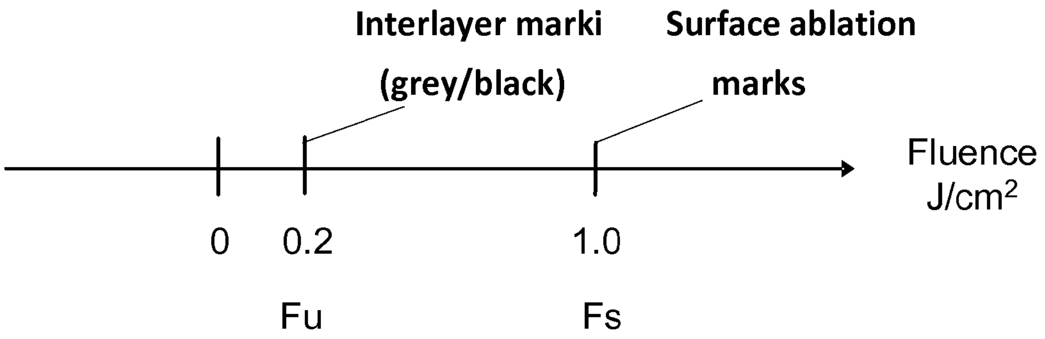

The relationship between bleaching anodization dye, marking aluminum and causing surface ablation for 532 nm (green) laser wavelengths is shown in FIG. 9. For 532 nm (green) laser pulses with parameters within those given in Tables 1, 2 and 3, FIG. 9 shows the fluence thresholds in Joules/cm2 for bleaching anodization (Fb), marking aluminum under the anodization (Fu), and surface ablation (Fs). For an aspect of the instant invention 532 nm laser pulses yield the values are Fb=0.1 J/cm2, Fu=0.13 J/cm2, and Fs=0.18 J/cm2. FIG. 10 shows the fluence thresholds in Joules/cm2 for 1064 nm (IR) laser pulses with parameters within those given in Tables 1, 2, and 3. For an aspect of the instant invention the fluence threshold values for 1064 nm laser pulses in Joules/cm2 are Fu=0.2 J/cm2 and Fs=1.0 J/cm2. Note that no threshold for bleaching anodization is available since IR wavelength laser pulses do not begin to bleach anodization until laser fluence is great enough to cause damage to the overlaying anodization. Note that the exact values for Fb, Fu and Fs will depend upon the particular laser and optics used. They must be determined experimentally for a given processing setup and article to be marked and stored in the controller for later use.

Figure 11:
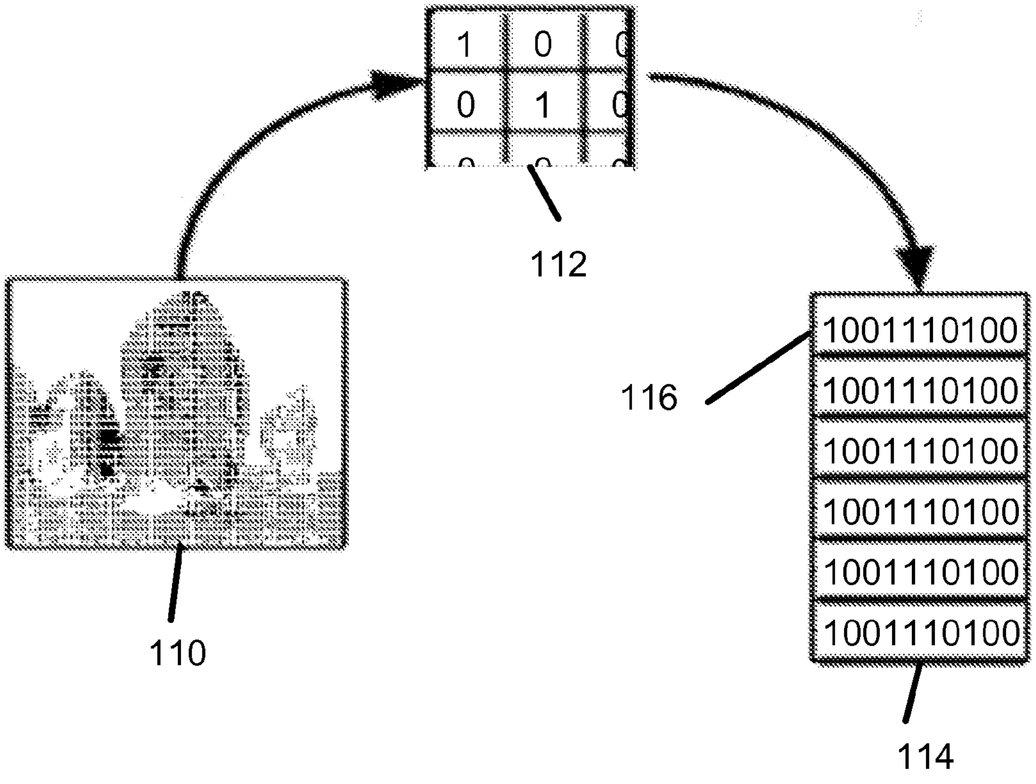

In another embodiment of this invention, the programmable nature of the adapted laser processing system permits the marking of anodized aluminum articles with commercially desirable marks in patterns. As shown in FIG. 11, in this aspect a pattern 110 is converted into a digital representation 112, which is decomposed into a list 114, where each entry 116 in the list 114 contains a representation of a location or locations, with a color and optical density associated with each location. The list 114 is stored in the controller 20. The controller 20 associates laser parameters with each entry 116 in the list 114, which laser parameters, when sent as commands to the laser 10, optics 14 and motion control stage 22 will cause the laser 10 to generate one or more laser pulses 12 which impinge aluminum article 18 at or near the surface 16. These pulses will create a mark with the desired color and optical density. By moving the laser pulses 12 in relation to the aluminum article 18 according to the locations stored in the list as the marks are being created, marks of the desired range of colors and optical density are made on the anodized aluminum surface in the desired pattern.

In another embodiment of this invention colored anodization is patterned over previously patterned marks to present additional colors and optical densities. In this aspect, a grayscale pattern is created on an anodized aluminum article. The article is then coated with a photoresist coating that can be developed by exposure to laser pulses. The grayscale patterned, photoresist coated article is placed into the laser processing system and aligned so that the system can apply laser pulses in registration with the pattern already applied to the article. The photoresist used is a type known as "negative" photoresist, where areas exposed to laser radiation will be removed and the unexposed areas will remain on the article following subsequent processing. The remaining photoresist protects the surface of the article from introduction of dyes, while the areas of the anodization which had been exposed and subsequently removed will be dyed the desired color. This anodization layer is designed to be translucent in order to allow light to pass through the anodization to the pattern below and be reflected back through the anodization and thereby create color patterns with selected color and optical density. This color anodization can also be bleached if necessary using techniques disclosed by other aspects of this invention to create a desired color with desired transparency. This color can be applied over areas of the underlying pattern or applied on a point-by-point basis down to the limits of resolution of the laser system, typically in the 10 to 400 micron range. This operation can be repeated to create multiple color overlays. In one aspect of this invention, the anodization color overlay is applied in a multiple color overlay grid, such as Bayer pattern. By designing the grayscale pattern to work with the color overlay grid, a durable, commercially desirable full color image can be created on the anodized aluminum article.

Figure 12A:
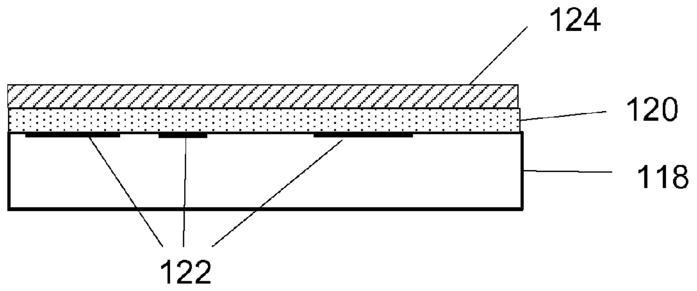
Figure 12B:
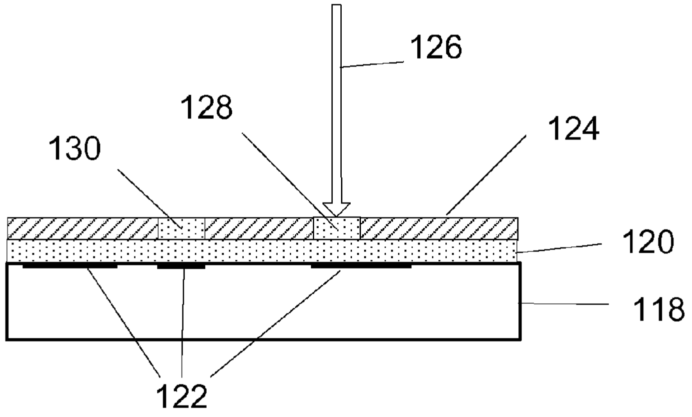
Figure 12C:
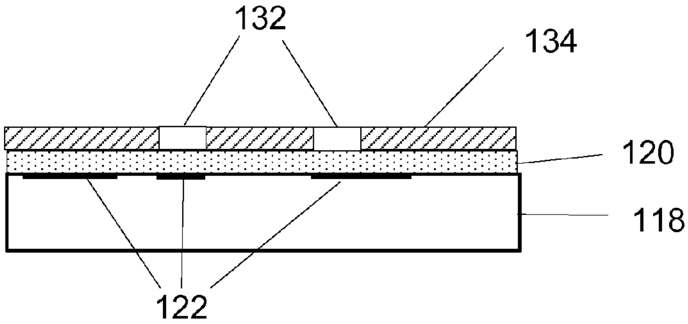
Figure 12D:
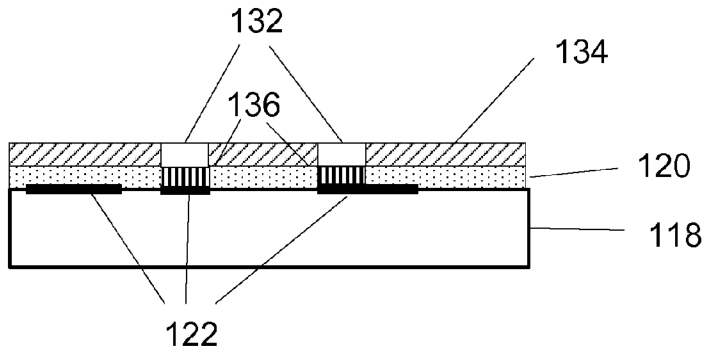
Figure 12E:
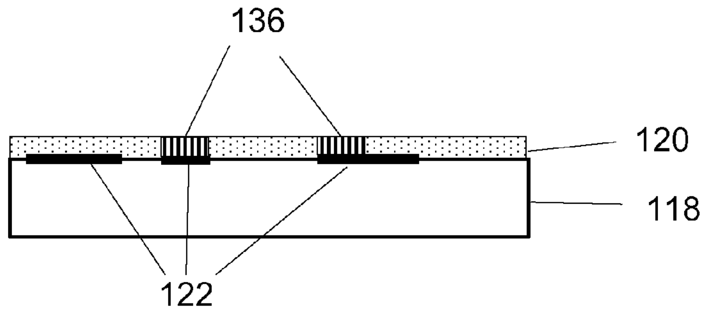

FIGS. 12*a* through 12*i* show a sequence of steps used to create this color overlay for two colors. In FIG. 12*a*, an aluminum article 118 has a transparent anodization layer 120 and marks 122 previously applied according to other aspects of this invention. A negative photoresist 124 is applied to the surface of the transparent anodization 120. In FIG. 12*b*, laser pulses 126 expose areas 128, 130 of the photoresist 124. In FIG. 12*c* the unexposed resist 134 remains following resist processing, but the exposed resist has been removed leaving voids 132 in the processed resist layer 134. FIG. 12*d* shows the base anodization layer 120 with sections 136 where the anodization has been dyed with color beneath the voids 132 in the processed resist layer 134. The intact processed resist 134 prevents the anodization from acquiring color anywhere except where the processed resist 134 has been removed 132. FIG. 12*e* shows the article 118 with base anodization 120 with color portions of anodization 136 in relation to previously applied marks 122 following removal of processed resist.

Figure 12F:
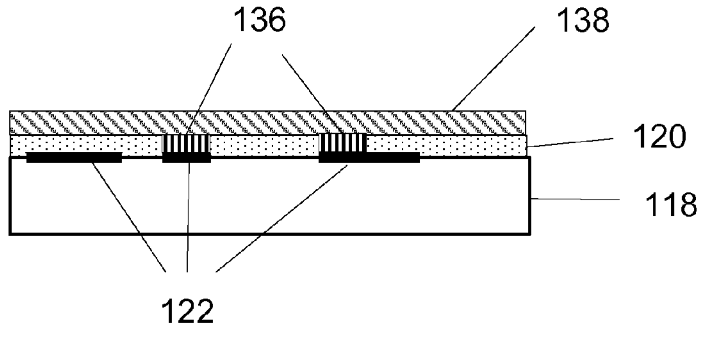
Figure 12G:
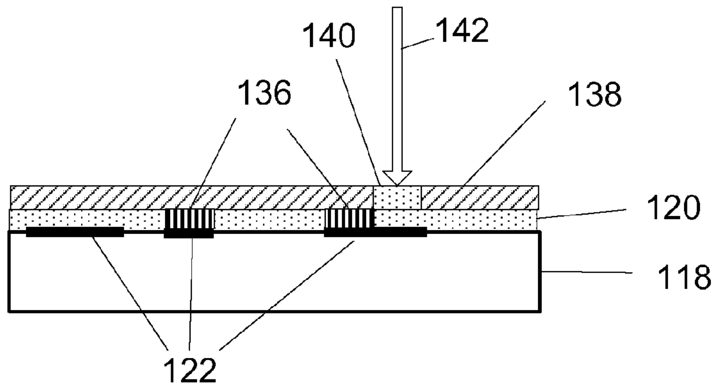
Figure 12H:
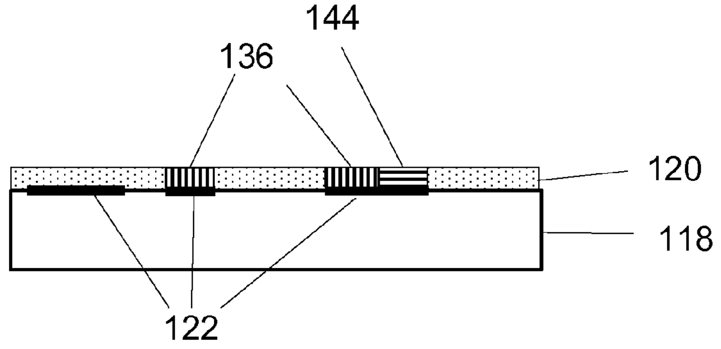
Figure 12I:
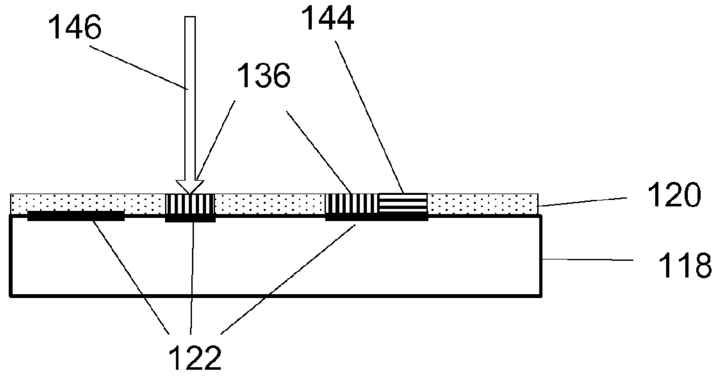

FIG. 12*f* shows an article 118 with base anodization 120 including colored portions 136 and a second resist layer 138. FIG. 12*g* shows this second layer of resist 138 impinged by laser pulses 142 to cause area 140 to become exposed. FIG. 12*h* shows the article 118 with base anodization 120 following processing to, dye the anodization beneath the removed resist 140, and removal of the remaining resist 138. This leaves the intact base anodization layer with colored areas 136, 144 over the previously marked areas 122. FIG. 12*i* shows subsequent laser pulses 146 being used to optionally bleach portions of the previously anodized and dyed portions of the aluminum article to create additional desired colors or optical densities. The processing described by this aspect of this invention results in a colored pattern being overlaid over a grayscale pattern, yielding marks with a wide range of durable, commercially desirable colors and optical densities in patterns which are programmable.

In another embodiment of this invention, the color anodization may be created on the anodized aluminum article in particular patterns which yield the appearance of full color images when viewed. In this aspect, a pattern representative of an image is applied to the surface using techniques described herein. The color dyes are introduced in the manner illustrated in FIGS. 12*a* through 12*i*, except that the pattern with which these dyes are introduced into the base layer of anodization is designed to convert the grayscale representation into full color. An example of such a pattern is a Bayer filter (not shown), which juxtaposes red, green and blue filter elements in a pattern such that the eye perceives the red, green and blue elements fusing into a single color with optical density related to the grayscale mark underneath the color anodization filters, thereby creating the appearance of a full color image or pattern. The resist may be negative or positive resist, and the patterns which expose the resist may be created by masks, such as used in circuit or semiconductor applications, or directly written by an electronic means or directly deposited by technologies such as inkjet or directly ablated by laser.

Figure 13:
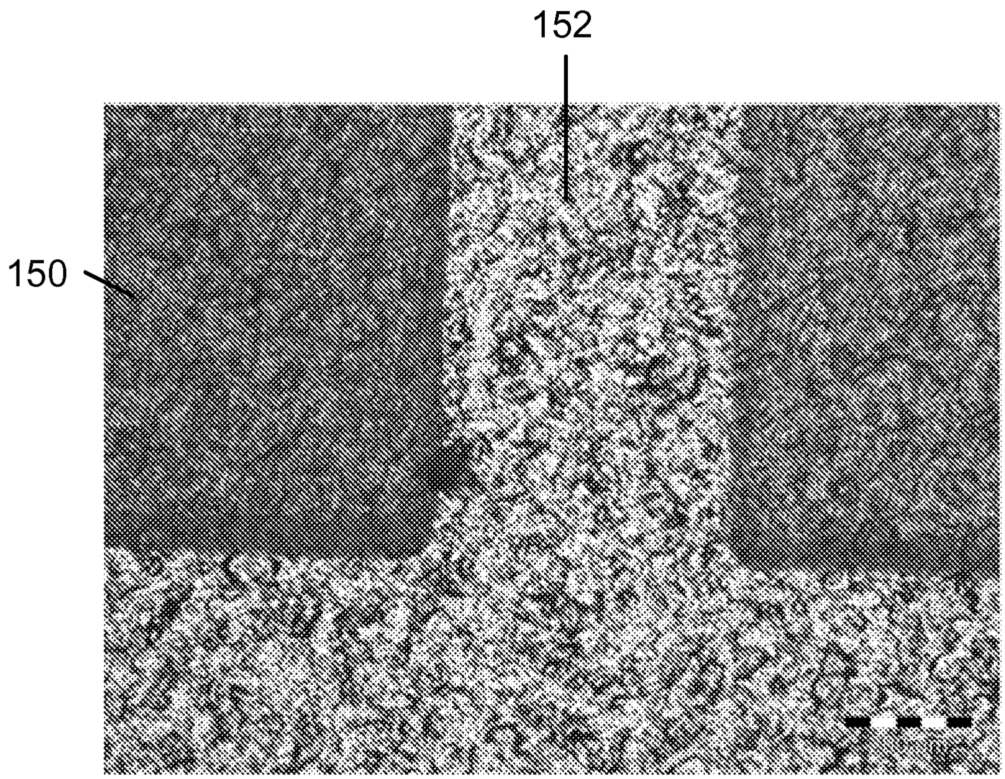

In another embodiment of this invention, bright, white marks can be applied to anodized aluminum articles using a laser marking system as adapted herein. In this embodiment, the laser parameters are selected to very slightly exceed the damage threshold for the anodization layer without causing ablation. As shown in FIG. 13, this embodiment marks anodized aluminum articles by creating low level damage in the anodization layer without causing the anodization to ablate or otherwise be removed from the surface. FIG. 13 shows an anodized article 150 with a white mark 152 created in this manner by an embodiment of this invention. The low level damage comprises a large number of small "micro" cracks in the anodization that scatter light of all wavelengths giving the surface a "frosted" or matte white appearance. Since the anodization has not been structurally damaged or breached on a macro scale, the surface retains its durability and has no apparent change in texture. The laser parameters used to create bright, white marks on anodized aluminum provide laser fluences that are slightly greater than the damage threshold for the anodization. The laser fluence is selected to be great enough to create micro cracks in the anodization but not great enough to cause enough damage to change the durability or perceptible texture of the article. Table 5 contains laser parameters used to create bright, white marks on an anodized aluminum article as shown in FIG. 13.

TABLE 5

| Laser parameters for white anodization marking | |
|---|---|
| Laser Type | DPSS Nd:YOV4 |
| Wavelength | 355 nm |
| Pulse duration | 100 ns |
| Pulse temporal | Gaussian |
| Laser power | 4 W |
| Rep Rate | 90 KHz |
| Speed | 200 mm/s |
| Pitch | 10 microns |
| Spot size | 350-400 microns |
| Spot shape | Gaussian |
| Focal Height | 0-5 mm |

By varying the laser fluence used within an indicated range near the damage threshold for that particular anodization and article the appearance of the mark can range from slightly frosted to fully opaque, bright white. In addition, this embodiment can combine this effect with colored anodization to create a mark with varying degrees of saturation. As the laser fluence increases, a dyed anodization layer will first appear to unsaturate, meaning that the colors appear to be mixed with white. As the laser fluence increases, the colored anodization bleaches out and the mark takes on an uncolored bright, white appearance Laser parameters for creating these bright, white marks include using a 355 nm wavelength third harmonic, diode-pumped solid-state Nd:$YVO_4$ laser, being a high power pulsed laser emitting energy in the range of 266 to 532 nm. The laser operates at 4 KW, being in the range of 1 KW to 100 KW, or more preferably 1 KW to 12 KW. Laser fluence ranges from about $0.1\times10^{-6}$ Joules/cm$^2$ to 100.0 Joules/cm$^2$ or more particularly from $1.0\times10^{-6}$ Joules/cm$^2$ to 10.0 Joules/cm$^2$. Pulse durations range from 1 ps to 1000 ns, or more preferably from 1 ns to 200 ns. The laser rep rate is in the range from 1 K Hz to 100 M Hz, or more preferably from 10 KHz to 1 MHz. The speed with which the laser beam moves with respect to the article being marked ranges from 1 mm/s to 10 m/s, or more preferably from 100 mm/s to 1 m/s. The pitch or spacing between adjacent rows of laser pulses on the surface of the article ranges from 1 micron to 1000 microns or more preferably from 10 microns to 100 microns. The spot size of the laser pulses measured at the surface of the article ranges from 10 microns to 1000 microns or more preferably from 50 microns to 500 microns. The location of the focal spot of the laser pulses with respect to the surface of the article ranges from −10 mm to +10 mm or more particularly from 0 to +5 mm.

Figure 14:
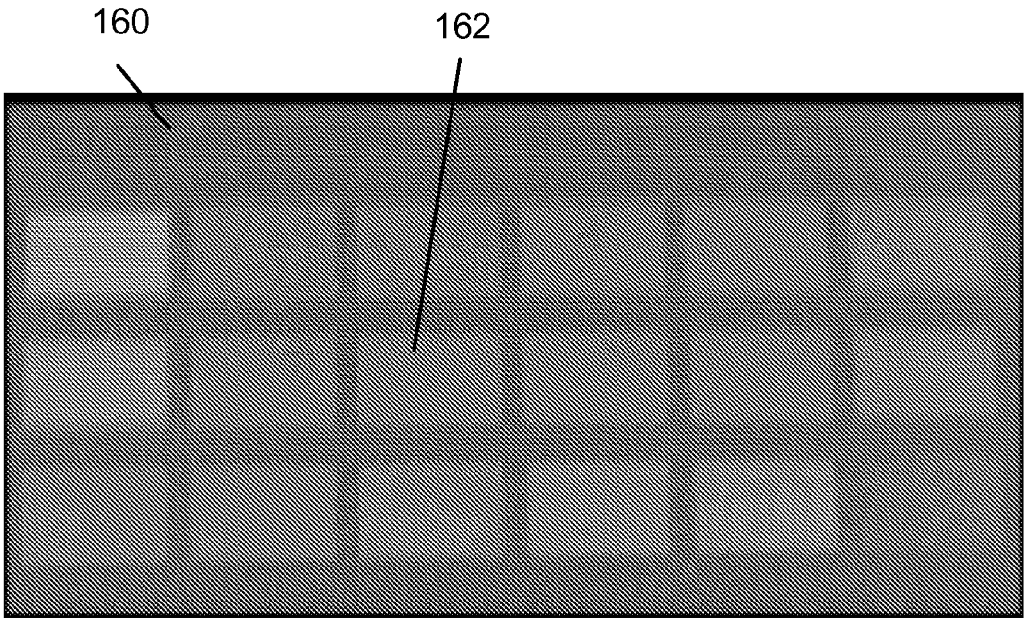

FIG. 14 shows a clear anodized aluminum article 160 with three rows of six marks 162 each applied to the surface using laser parameters as listed in Table 5 where the spot size varies from 200 microns in the leftmost column increasing by 60 microns each column to 500 microns in the rightmost column. The pitch, or distance between adjacent lines of laser pulses, increases from 10 microns in the top row to 20 microns for the middle row to 50 microns in the bottom row. It can be seen that the brightness of the white marks increases and the transparency decreases with increasing power.

Embodiments of this invention mark articles with infrared laser pulses including $CO_2$ lasers. Laser parameters used to successfully mark anodized articles with white marks made by creating alterations in the anodization layer are listed in Table 6.

TABLE 6

| Laser parameters for white anodization marking | |
|---|---|
| Laser Type | $CO_2$ |
| Wavelength | 10.6 micron |
| Pulse duration | 5 microseconds |
| Laser power | 75 W |
| Rep Rate | 100 KHz |
| Speed | 200 mm/s |
| Pitch | 10 microns |
| Spot size | 50 microns |
| Spot shape | Gaussian |

Laser parameters for creating these white marks include using a 10.6 micron wavelength $CO_2$ laser. The laser operates at 75 KW, being in the range of 1 KW to 500 KW, or more preferably 50 KW to 150 KW. Laser fluence ranges from about $1.0\times10^{-6}$ Joules/cm$^2$ to 100.0 Joules/cm$^2$ or more particularly from $1.0\times10^{-6}$ Joules/cm$^2$ to 10.0 Joules/cm$^2$. Pulse durations range from 1 ns to continuous wave operation, or more preferably from 100 ns to 100 ms. The laser rep rate is in the range from 1 K Hz to 1M Hz, or more preferably from 10 KHz to 250 KHz. The speed with which the laser beam moves with respect to the article being marked ranges from 1 mm/s to 10 m/s, or more preferably from 100 mm/s to 1 m/s. The pitch or spacing between adjacent rows of laser pulses on the surface of the article ranges from 1 micron to 1000 microns or more preferably from 10 microns to 100 microns. The spot size of the laser pulses measured at the surface of the article ranges from 10 microns to 1000 microns or more preferably from 50 microns to 500 microns.

It will be apparent to those of ordinary skill in the art that many changes may be made to the details of the above-described embodiments of this invention without departing from the underlying principles thereof. The scope of the present invention should, therefore, be determined only by the following claims.

I claim:

1. A method for marking an anodized article, the method comprising:

providing a laser marking system having a laser with controllable laser fluence;

determining said laser fluence associated with creating a mark with a white color; and directing the laser marking system to mark said anodized article using said determined laser fluence thereby creating said mark with said white color, wherein directing the laser marking system comprises directing the laser marking system to mark said anodized article such that a texture of a surface of the anodized article in the vicinity of the mark is substantially indistinguishable from a texture of the surface of the anodized article outside the vicinity of the mark.

2. The method of claim 1 wherein said anodized article comprises metal.

3. The method of claim 2 wherein said metal comprises aluminum.

4. The method of claim 1 further comprising adding dye to an anodization of the anodized article.

5. The method of claim 4 further comprising laser bleaching said dye added to said anodization.

6. An anodized article having a mark made with a laser, wherein the appearance of said mark is a result of laser-induced damage causing scattering of light in an anodization layer of the anodized article.

7. The article of claim 6 wherein said anodized article comprises metal.

8. The article of claim 7 wherein said metal comprises aluminum.

9. The article of claim 6 wherein the anodization layer is dyed with a dye.

10. The article of claim 9 wherein said dye of said dyed anodization layer is laser bleached.

11. The method of claim 1, wherein directing the laser marking system comprises directing the laser marking system to mark said anodized article using said determined laser fluence such that said mark has an optical density ranging from transparent to opaque.

12. The method of claim 1, wherein the anodized article comprises a substrate and an anodic oxide layer on a surface of the substrate and wherein directing the laser marking system comprises directing the laser marking system to mark said anodized article such that the anodic oxide layer remains substantially intact in the vicinity of the mark.

13. The article of claim 6, wherein the mark has a white color.

14. The article of claim 6, wherein a texture of a surface of the anodized article in the vicinity of the mark is substantially indistinguishable from a texture of the surface of the anodized article outside the vicinity of the mark.

15. The article of claim 6, wherein the anodized article comprises a substrate and an anodic oxide layer on a surface of the substrate and wherein the anodic oxide layer is substantially intact in the vicinity of the mark.

16. A method for marking an anodized article having a substrate and an anodic oxide layer on the substrate, the method comprising:

modifying a region of the anodic oxide layer to form a modified oxide region having a plurality of cracks configured to scatter light within the modified oxide region.

17. The method of claim 16, wherein modifying the region of the anodic oxide layer comprises directing a laser pulse onto the anodized article.

18. The method of claim 16, further comprising adding a dye to the region of the anodic oxide layer.

19. The method of claim 16, wherein the plurality of cracks are configured to scatter light within the modified region such that a visual appearance of a portion of the anodized article inside the mark is lighter than a visual appearance of another portion of the anodized article outside the mark.

* * * * *